United States Patent [19]

Malinowski

[11] 4,129,383

[45] Dec. 12, 1978

[54] SMOKE DETECTOR AND HOUSING ASSEMBLY THEREFORE

[75] Inventor: William J. Malinowski, Pembroke, Mass.

[73] Assignee: Chloride Incorporated, Tampa, Fla.

[21] Appl. No.: 656,833

[22] Filed: Feb. 10, 1976

[51] Int. Cl.[2] .............................................. G01N 21/00

[52] U.S. Cl. ...................................... 356/439; 250/574; 340/630; 356/338; 356/440

[58] Field of Search ........................ 356/103, 104, 207; 250/574, 239; 340/237 S

[56] References Cited

U.S. PATENT DOCUMENTS

| | | | |
|---|---|---|---|
| 3,799,670 | 3/1974 | Kohr | 356/207 |
| 3,914,616 | 10/1975 | Moolbroek | 356/207 |
| 3,916,209 | 10/1975 | Steele et al. | 250/574 |

*Primary Examiner*—Conrad J. Clark
*Attorney, Agent, or Firm*—Robert E. Ross

[57] ABSTRACT

A smoke detector and housing assembly therefore in which the housing components are designed to allow rapid assembly of the detector with a minimum amount of labor. In a preferred embodiment of the invention a retainer for a photo-cell and light source is provided with a medial portion retaining the photo-cell and portions extending forwardly from the ends of the medial portion for projecting a light beam through the field of view of the photo-cell. The retainer is molded in two similar halves and fastened together after assembly of the photo-cell, light source, and other components therein.

A base plate is provided with suitable apertures for receiving the forwardly projecting portions of the retainer so that after assembly they protrude from the forward face thereof. A cylindrical member and cover are mounted on the forward face of the base plate between the forwardly projecting portions of the retainer, forming a dark chamber across which the light beam projects, and into which the photo-cell views.

All of the components of the housing are formed of injection molded plastic, with suitable portions provided to accurately position the components in relation to each other during assembly.

4 Claims, 7 Drawing Figures

SMOKE DETECTOR AND HOUSING ASSEMBLY THEREFORE

BACKGROUND OF THE INVENTION

This invention relates to smoke detectors operating on the reflected light principle, in which a dark chamber is provided with means allowing ambient atmosphere to diffuse into the chamber, with a light source projecting a light beam across the chamber. A photo-cell is positioned to view the center of the light beam transversely. When smoke enters the chamber, light reflected from smoke particles onto the photo-cell causes the resistance of the photo-cell to decrease. The decrease in resistance corresponding to a predetermined smoke concentration is utilized to actuate an alarm through suitable circuitry.

In the construction of such a device, the accurate positioning of the light source, photo-cell, and the components forming the dark chamber is essential, to provide consistency in calibration and sensitivity. In volume production, the assembly must be accomplished both accurately and economically.

In U.S. Pat. No. 3,799,670 there is illustrated a smoke detector of the above-described type, which utilizes a housing formed of injection molded components formed to facilitate accurate assembly. Although the specific embodiment of the detector illustrated in said patent has achieved considerable commercial success, the number of mechanical components of the detector results in an assembly cost that is higher than desired. Also, the greater the number of components, the greater the chance for errors in assembly.

SUMMARY OF THE INVENTION

This invention provides a smoke detector and a housing therefore which comprises a minimum number of mechanical components designed for accurate and economical assembly.

The housing includes a retainer formed of two similar pieces, which, when assembled together, provides a medial portion receiving a photo-cell and a portion projecting forwardly from each end of the medial portion, one portion receiving a light source and the other portion forming a light trap.

A base plate is provided with suitable apertures to receive the forwardly projecting portions of the retainer so that said portions project from the forward face thereof.

To provide a dark chamber, a cylindrical wall is assembled onto the forward face of the base plate so as to enclose the ends of the forwardly projecting portions of the retainer, and a cap is disposed over the end of the wall opposite the base plate. The cap and the portion of the base plate adjacent to the wall are provided with suitable peripheral recesses to allow the diffusion of ambient atmosphere into the dark chamber.

The mechanical components of the detector are provided with means to insure accurate positioning of the components in relation to each other. Assembly may be accomplished by adhesives or by providing the components with resilient inter-engaging portions that snap together, or, by a combination thereof.

DESCRIPTION OF THE ILLUSTRATED EMBODIMENT

Figure 1:
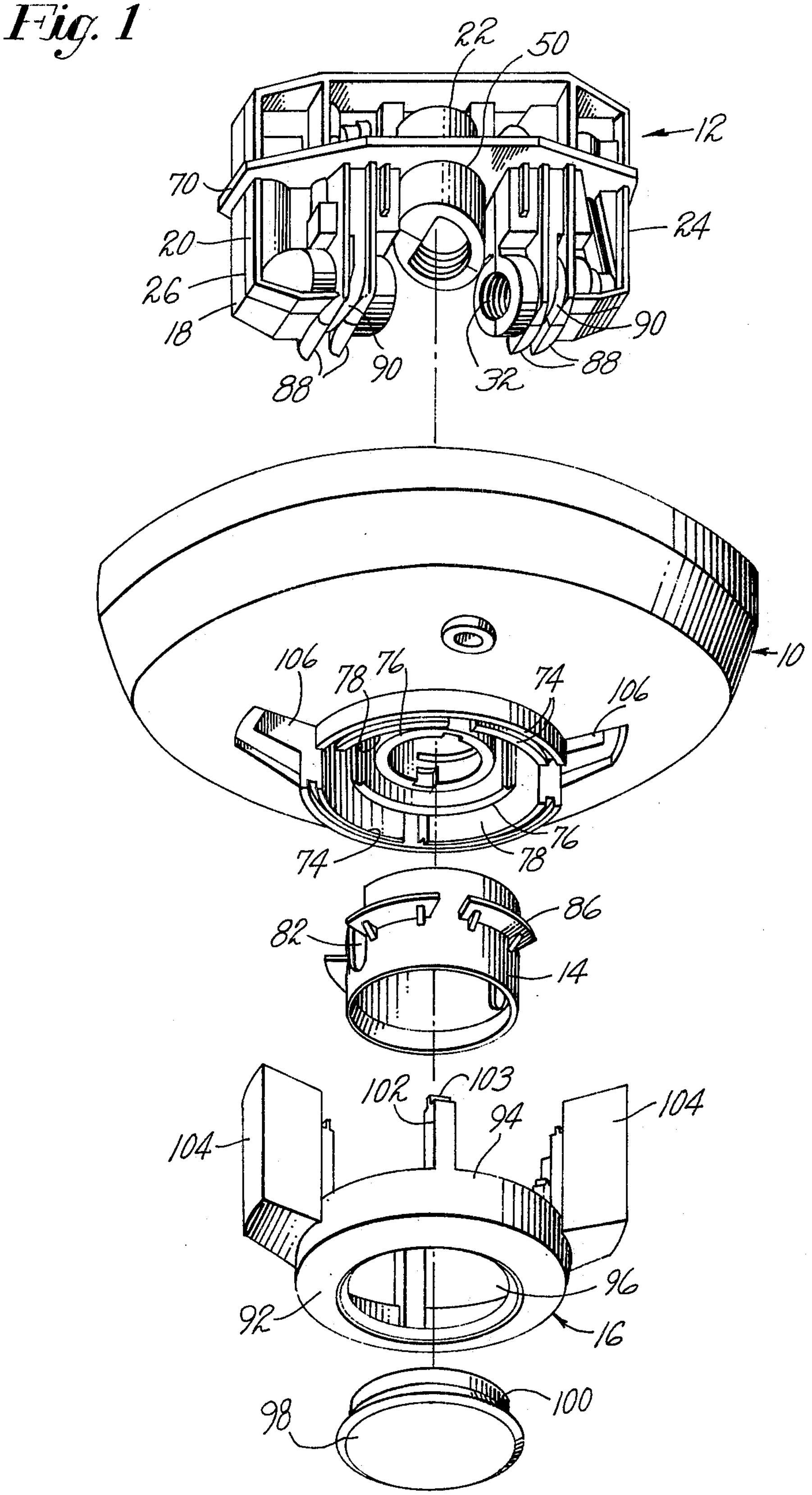
FIG. 1 is an exploded perspective view of the housing components of a smoke detector embodying the features of the invention.
Figure 2:
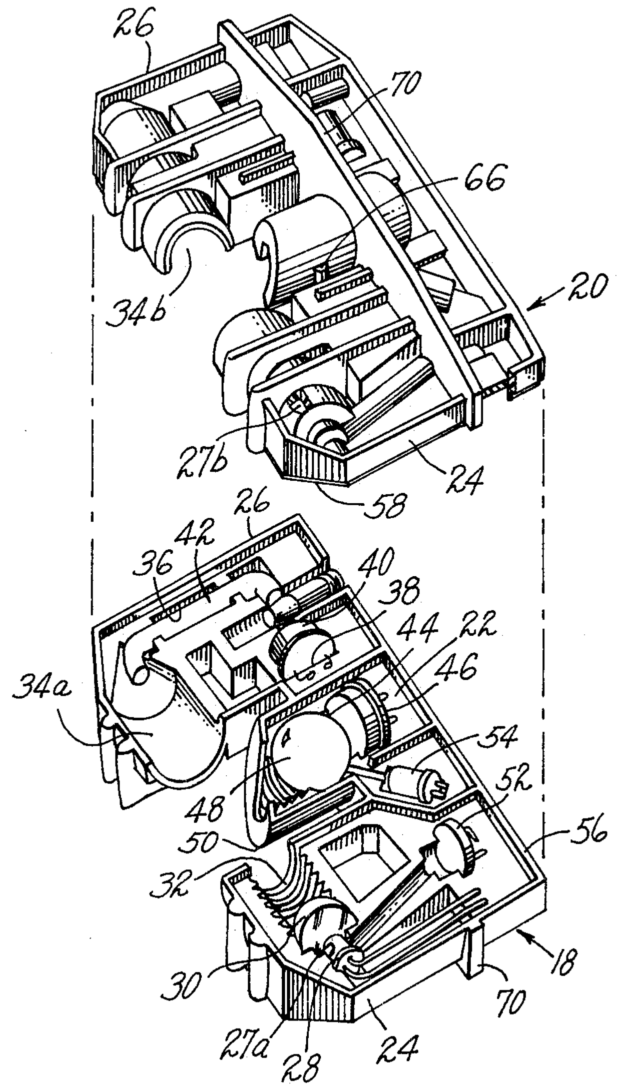
FIG. 2 is a perspective view of the two portions of the retainer for the light source and photo-cell showing the internal structure thereof.
Figure 3:
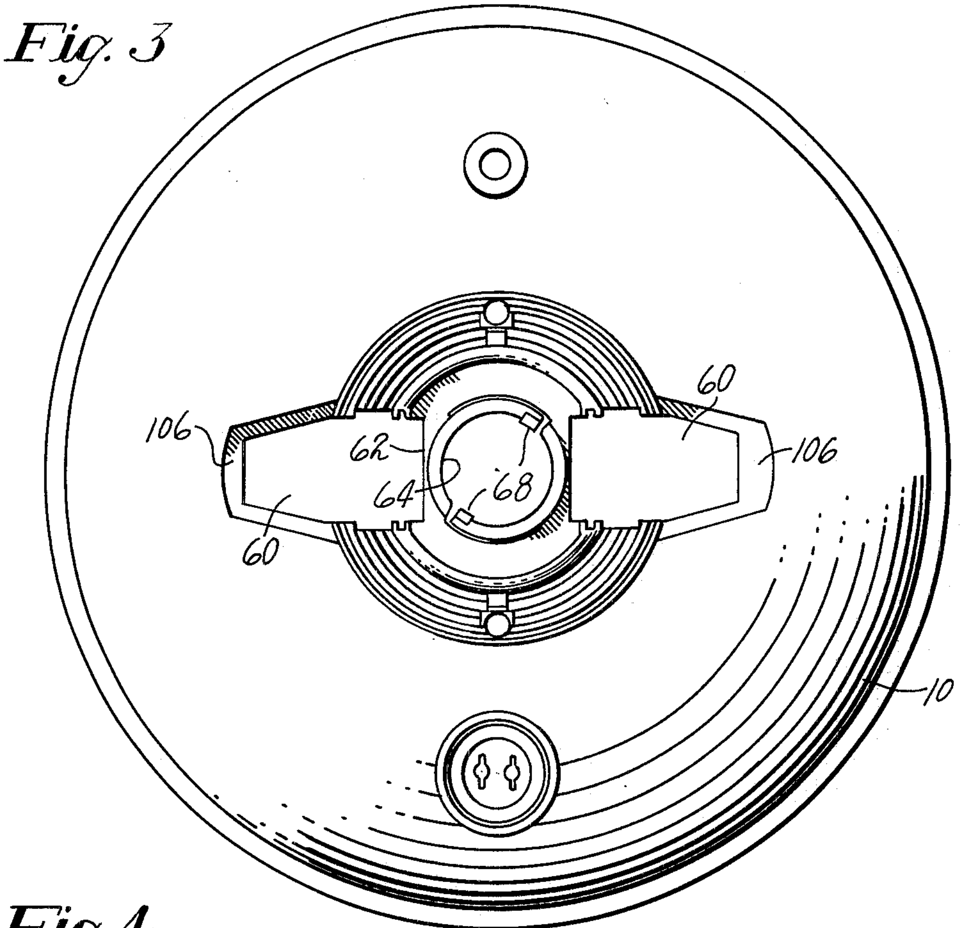
FIG. 3 is a top plan view of the base plate.
Figure 4:
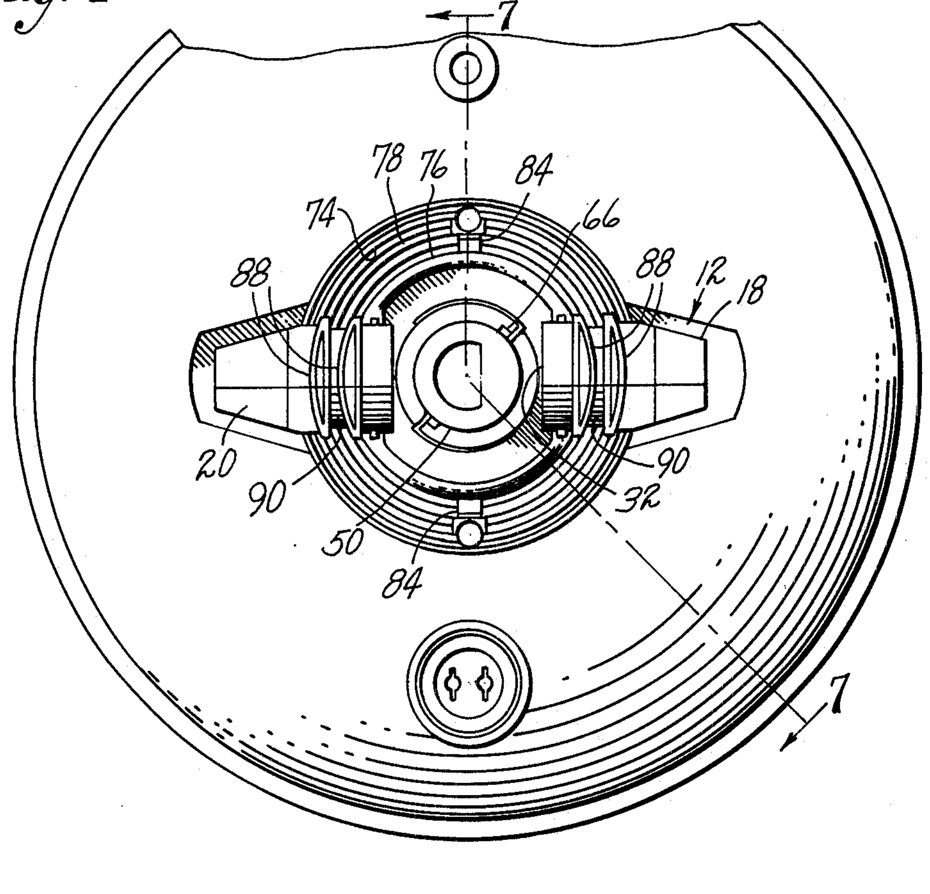
FIG. 4 is a top plan view of the base plate and the retainer assembled therewith.
Figure 5:
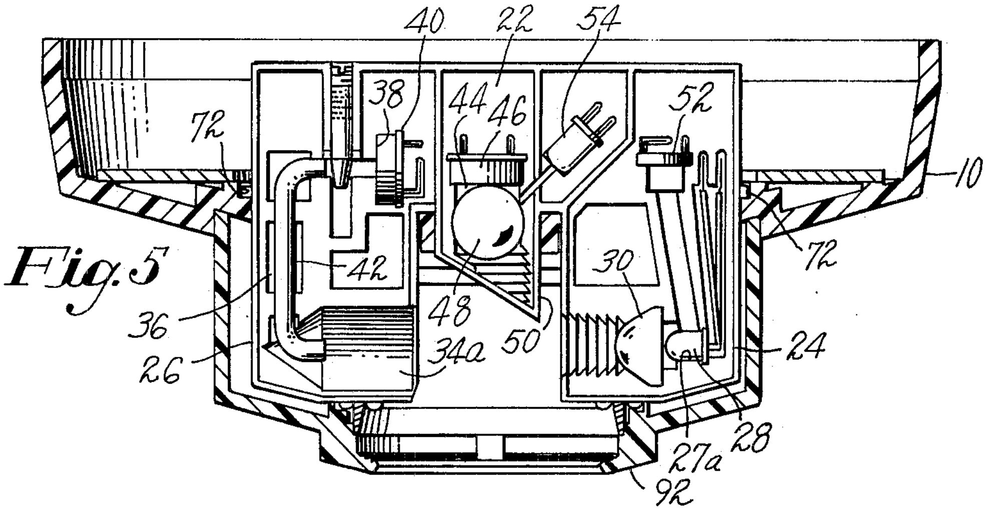
FIG. 5 is a view in side elevation of the housing portions illustrated in FIG. 4, with the cover assembled thereon, the base plate and cover being in section, and the front half of the retainer being removed to show the internal structure and position of the components.
Figure 6:
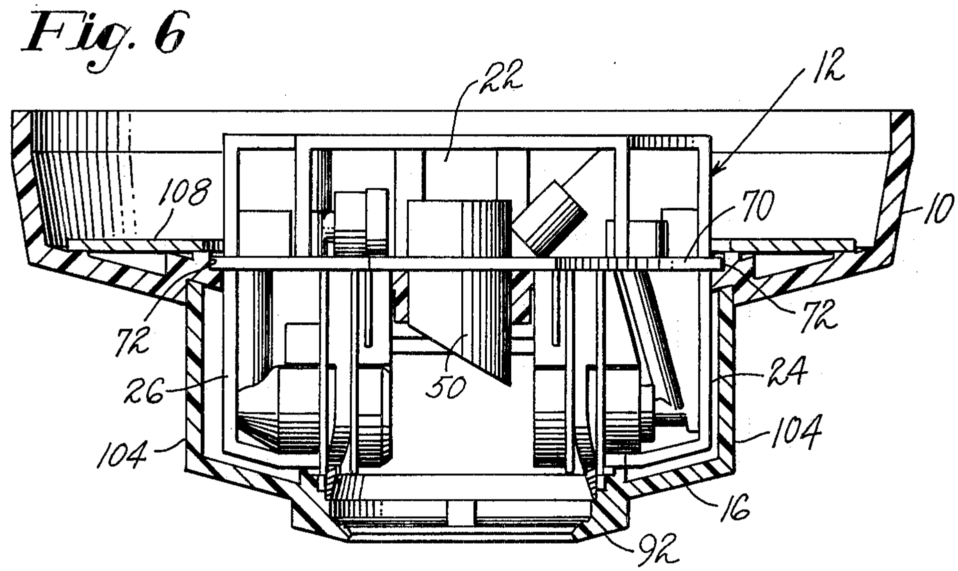
FIG. 6 is a view similar to FIG. 5 in which the complete retainer is in plan and the cover in section.
Figure 7:
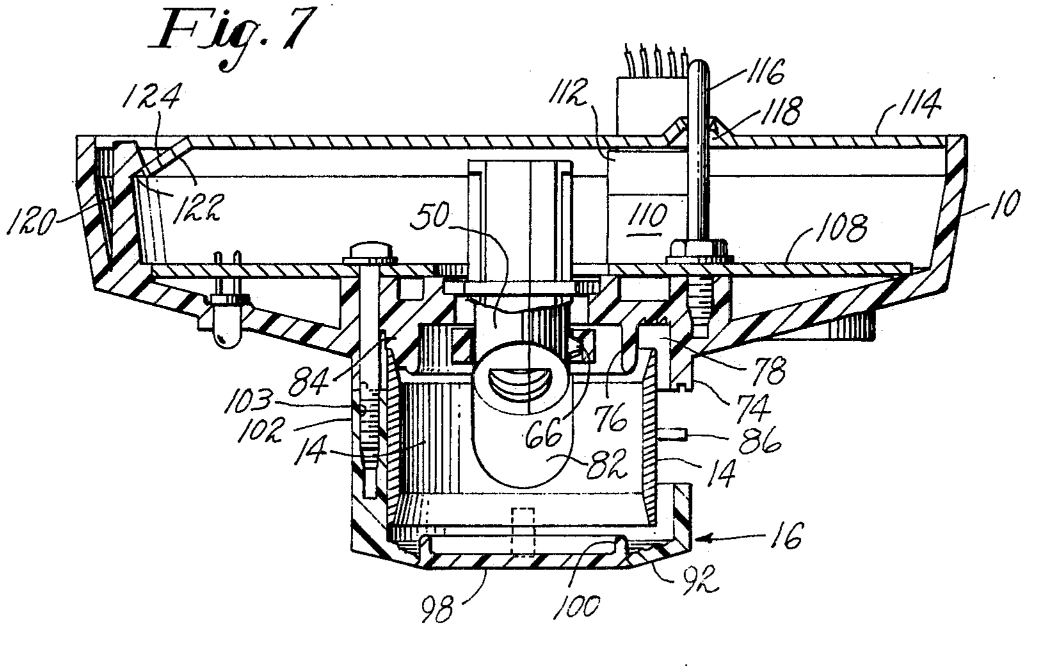
FIG. 7 is a view in section taken on line 7—7 of FIG. 6.

Referring to the drawing, there is illustrated a smoke detector and detector housing embodying the features of the invention.

The housing comprises a base plate 10, an optical component retainer assembly 12, a cylindrical dark chamber wall 14, and a cover assembly 16.

The retainer assembly 12 is formed of two similar pieces of injection molded plastic 18 and 20 shaped to provide, when assembled with each other, a medial portion 22 and forwardly extending portions 24 and 26 at each end of the medial portion.

The surfaces of the pieces 18 and 20 that abut each other when assembled are molded with recesses which form cavities when the two pieces are assembled to receive the components of the detector and to position them accurately, in a manner to be described.

The forwardly extending portion 24 is thus provided, by recesses **27*a* and 27*b*, with an internal cavity shaped and dimensioned to receive a light source 28, a lens 30, and to form an opening 32 for allowing the light from the light source to project toward the other forwardly extending portion 26. Said other portion 26 is provided with recesses 34*a* and 34*b*** forming an opening serving as a light trap to prevent reflection of the light beam.

In the illustrated modification of the invention, recesses in the abutting faces also provide a channel 36 leading from the light trap opening 34 to a separate cavity 38 for receiving a compensating photo-cell 40. A light pipe such as an acrylic rod 42 may be disposed in the channel 36 to conduct light from the light trap 34 to the photo-cell 40.

The abutting faces of the medial portions of the retainer halves are provided with recesses forming a cavity 44 for receiving a smoke detector cell 46 and a lens 48, and with portions forming a forwardly extending tube 50 for restricting the field of view of the cell.

As mentioned above, the abutting surfaces of the two halves 18 and 20 of the retainer which, in the illustrated embodiment, are substantially mirror images, are provided in molding with the surface recesses that provide the above-described cavities when the two halves are mated together. This structure allows the components such as the photo-cells, light pipe, and light source, to be positioned into one half of the retainer, and the other half then assembled thereon. The resulting internal cavities securely and accurately position the components in the proper position.

If desired, cavities may be provided for other components, such as a light monitor photo-cell 52 and a test light 54.

Interengaging means is also provided on the two halves of the retainer such as a peripheral flange 56 on one half and a peripheral recess 58 on the other half to position the two halves laterally in relation to each other. The two halves may be held together in any desired manner, such as by fasteners, adhesives, or by resilient portions (not shown) that can be snapped together.

The base plate 10 is provided with an elongated central aperture 60 shaped to receive the assembled retainer so that the forwardly extending portions 24 and 26 project from the forward face thereof. A crosspiece 62 extends across the center portion of the opening, having a forwardly extending collar 64 with portions thereof that are radially resilient. The tube 50 projecting forwardly from the center of the retainer is provided with radial lugs 66 which are positioned and dimensioned to snap into recesses 64 on the ends of the radially resilient portions, to hold the retainer in assembly with the base plate. To hold the retainer securely against lateral movement and to limit the forward movement thereof, the retainer is provided with a peripheral flange 70, which seats in a recess 72 of similar shape on the rear side of the base plate.

The forward face of the base plate is provided a pair of concentric upstanding walls 74 and 76 (interrupted at opposing portions to allow the forwardly projection portions of the yoke to pass therethrough) forming a channel 78.

To provide a dark chamber on the forward face of the base that will enclose the light opening, the light trap and the photo-cell tube, the cylindrical dark chamber wall 14 is provided, having openings 82 in opposite portions that extend to the bottom edge of the wall. The dark chamber wall thus may be assembled onto the forward face of the base plate so that the forwardly projecting portions 24 and 26 of the yoke are disposed in the apertures, and the bottom end of the wall is seated in the recess 72, held off the bottom thereof by spacers 84. The outer and inner walls 74 and 76, in conjunction with the dark chamber wall 14, form a labyrinth allowing diffusion of ambient atmosphere into the dark chamber without allowing excessive ambient light to enter the chamber. To provide further shielding from ambient light, a radial flange 86 is provided on the dark chamber wall so as to be disposed a predetermined small distance above the outer wall 74. The forwardly projecting portions 24 and 26 of the retainer are provided with spaced projecting ribs 88 providing recesses 90 into which the edges of dark chamber wall aperture 82 seat, to assist in sealing the assembly against the entrance of ambient light, and to support the cylindrical wall against lateral movement.

To close the outer end of the dark chamber, and to retain the dark chamber wall in assembly, a cover 92 is disposed over the outer end of the wall. The central portion of the cover has a depending wall 94 dimensioned to extend around the outer end of the dark chamber wall in spaced relation thereto, with a central aperture 96 closed by a removable cap 98. The cover 98 has a circular flange 100 on the inner surface positioned to extend inside the end of the dark chamber wall in spaced relation thereto.

The retainer wall 94, the end of the dark chamber wall 14, and the cover flange 100 form a second labyrinth for allowing ambient atmosphere to enter the chamber without allowing the entrance of ambient light.

To hold the retainer 92 onto the base plate 10, depending legs 102 may be provided which seat on the base plate and have apertures 103 in the ends to receive fasteners extending from the rear side of the plate.

Decorative covers 104 may be provided on opposing portions of the retainer to be disposed over the forwardly extending portions 24 and 26 of the optical component retainer 12, the lower ends thereof seating in recesses 106 to support the cover against lateral movement.

Other electrical and electronic components necessary for the operation of the detector may be provided on a printed circuit board 108 mounted on the rear face of the base plate 10. The board may have one portion 110 of a multiple contact connector secured thereto for mating with the other portion 112 on a mounting plate 114 which may be secured to a junction box (not shown) or similar electrical mounting fixture.

Positioning pins 116 are provided on the printed circuit board for entering suitable apertures 118 in the mounting plate to align the connector portion 110 on the printed circuit board with the connector portion 112 on the mounting plate when the detector is assembled thereon.

To retain the assembled detector on the base plate, a pair of resilient legs 120 may be integrally molded onto the rear surface of the base plate with latching shoulders 122 on the ends thereof for snapping engagement with tongues 124 on the base plate.

The structure of the detector housing components permits rapid and accurate assembly on a production line basis. The optical components are positioned in one half of the yoke, where the recesses position the components accurately. Since each component will fit into only the specific recess, improper assembly is impossible. The electrical leads from the components extend through apertures in the yoke so positioned that the ends thereof protrude from the yoke on the rear side of the printed circuit board. Suitable indicia may be provided on the board to indicate the terminal to which each electrical lead is to be attached.

After the optical and other components have been assembled into one half of the retainer 12 the other half may be assembled thereon, and the two halves fastened together. The assembled yoke may be utilized as a subassembly and stockpiled for subsequent assembly operations.

The retainer may thereafter be assembled with the base plate by inserting the forwardly extending portions 24 and 26 into the opening 60 in the base plate from the rear side thereof and pushing the retainer through the opening until the lugs 66 on the tube 50 snap into engagement with the collar 64, as the flange 70 on the retainer seats in the recess 72 on the rear side of the base plate.

The printed circuit board 108 may then be assembled onto the rear side of the base plate and the necessary connections made between the component leads extending from the rear portion of the retainer and the appropriate terminals on the printed circuit board.

After the printed circuit board is assembled, the dark chamber wall 14 and the retainer 92 may be assembled onto the forward face of the base plate and retained therein by screws 126.

The illustrated embodiment of the invention is designed to incorporate a detector in which the photo-cell is a photo-resistive device and the light source is on continuously. Hence the dark chamber is necessary to prevent ambient light from reaching the photo-cell and causing a false alarm.

In U.S. Pat. No. 3,917,956 issued Nov. 4, 1975, there is disclosed a detector in which the photo-cell is a photo-voltaic device and the light source is a light emitting diode which is energized once every 1 or 2 minutes for a period of about 20 micro-seconds. Such a detector is immune to false alarms from all normal sources of ambient light, and therefore if the components thereof are utilized in the detector housing herein described, the dark chamber wall 14 may be omitted. Although the cover 92 may, in such case, also be omitted, it will usually be maintained as part of the assembly for reasons of appearance and to assist in preventing physical damage to the portion of the yoke protruding from the base plate. It may also be utilized to support a bug screen (not shown) when the detector is used in locations where the presence of insects in the housing could be troublesome.

Since certain obvious changes may be made by one skilled in the art in the specific embodiment of the invention herein illustrated and described, it is intended that all matter contained herein be interpreted in an illustrative and not a limiting sense.

I claim:

1. A smoke detector housing, comprising a support plate having a central aperture and a pair of apertures laterally spaced from the central aperture, an optical component retainer assembled with the base plate, said retainer having a base portion disposed on the rear side of the base plate, a medial portion projecting through the central aperture of the base plate, said medial portion having an internal cavity opening forwardly and shaped to receive a photo-cell, said retainer having a pair of forwardly projecting portions extending through the pair of laterally spaced apertures, one of said forwardly projecting portions having an internal cavity opening toward the other forwardly projecting portions to receive a light source so as to project a beam of light toward the other forwardly projecting portion, said other forwardly projecting portion having an aperture with an opening positioned in the path of said light beam, said medial portion having an internal cavity opening forwardly and shaped to receive a photo-cell in position to view the light beam, said support plate and said retainer having cooperating means positioning said retainer in relation to said support plate.

2. A smoke detector as set out in claim 1 in which said optical component retainer is formed of two similar halves with recesses in the abutting surfaces which form cavities and associated apertures to receive the optical components when the two halves are fastened together, and other apertures are provided opening from the cavities containing the optical components to the surface of the retainer on the rear side of the support plate for receiving electrical leads from said components so that the ends of said leads are positioned adjacent the means carrying the other circuit components.

3. A smoke detector housing, comprising a support plate having a recess on the rear side, a medial opening therethrough, and a pair of openings therethrough spaced laterally from the medial opening and an optical component retainer assembled with the support plate, said retainer being formed of two similar superimposed portions forming a base portion, a medial portion and two forwardly projecting portions disposed on opposite sides of the medial portion, said portions having cooperating interengaging means positioning them laterally in relation to each other when superimposed, and having recesses forming cavities when superimposed to receive optical components, said portions when superimposed forming positioning means shaped and positioned to cooperate with means on the support plate to position the retainer in relation to the support plate with the forwardly projecting portions extending through the pair of openings in the support plate and projecting forwardly therefrom.

4. A housing as set out in claim 3 in which the positioning means is a laterally extending flange providing a stop when the retainer is assembled into the support plate from the rear side thereof, said support plate having means receiving said flange to prevent lateral and rotational movement of the retainer in relation to the support plate.

* * * * *